United States Patent
Punuru (10) Patent No.: US 10,254,015 B2
(45) Date of Patent: Apr. 9, 2019

(54) MULTI-ZONE TRANSPORT REFRIGERATION SYSTEM WITH AN EJECTOR SYSTEM

(71) Applicant: THERMO KING CORPORATION, Minneaoplis, MN (US)

(72) Inventor: Premchand Reddy Punuru, Guntur (IN)

(73) Assignee: THERMO KING CORPORATION, Minneapolis, MN (US)

( * ) Notice: Subject to any disclaimer, the term of this patent is extended or adjusted under 35 U.S.C. 154(b) by 81 days.

(21) Appl. No.: 15/445,035

(22) Filed: Feb. 28, 2017

(65) Prior Publication Data
US 2018/0245822 A1    Aug. 30, 2018

(51) Int. Cl.
*F25B 5/02*    (2006.01)
*F25B 1/10*    (2006.01)
*F25B 49/02*   (2006.01)
*B60H 1/32*    (2006.01)

(52) U.S. Cl.
CPC .............. *F25B 5/02* (2013.01); *B60H 1/323* (2013.01); *B60H 1/3232* (2013.01); *F25B 1/10* (2013.01); *F25B 49/02* (2013.01); *B60H 2001/325* (2013.01); *B60H 2001/3238* (2013.01); *B60H 2001/3298* (2013.01); *F25B 2341/0011* (2013.01); *F25B 2400/0407* (2013.01); *F25B 2600/2501* (2013.01); *F25B 2700/151* (2013.01); *F25B 2700/197* (2013.01); *F25B 2700/1931* (2013.01); *F25B 2700/2104* (2013.01); *F25B 2700/2106* (2013.01); *F25B 2700/21152* (2013.01); *F25B 2700/21175* (2013.01)

(58) Field of Classification Search
CPC .... F25B 5/02; F25B 1/10; F25B 49/02; F25B 2400/0407; F25B 2600/2501; F25B 2700/151; F25B 2700/197; F25B 2700/21175; B60H 1/3223; B60H 1/323; B60H 2001/3298
USPC .......................................................... 62/203
See application file for complete search history.

(56) References Cited

U.S. PATENT DOCUMENTS

| | | |
|---|---|---|
| 5,628,205 A | 5/1997 | Rockenfeller et al. |
| 6,336,343 B1 | 1/2002 | Nishioka et al. |
| 6,360,552 B1 * | 3/2002 | Lee .......................... F25B 5/02 62/200 |
| 7,178,359 B2 | 2/2007 | Oshitani et al. |
| 7,254,961 B2 | 8/2007 | Oshitani et al. |

(Continued)

*Primary Examiner* — Henry T Crenshaw
(74) *Attorney, Agent, or Firm* — Hamre, Schumann, Mueller & Larson, P.C.

(57) ABSTRACT

Methods and systems for a MTRS with an ejector system are provided. The system can include a refrigeration circuit that has a compressor, a first heat exchanger downstream of the compressor, first and second heat exchange units downstream of the first heat exchanger, and an ejector system downstream of the first and second heat exchange units and upstream of the compressor. The first heat exchange unit provides independent climate control to a first zone of the transport unit. The second heat exchange unit provides independent climate control to a second zone of the transport unit. The ejector system mixes refrigerant exiting the first heat exchange unit with refrigerant exiting the second heat exchange unit, increases the pressure of the mixed refrigerant, and directs the mixed refrigerant to the compressor.

15 Claims, 5 Drawing Sheets

(56) References Cited

U.S. PATENT DOCUMENTS

| | | |
|---|---|---|
| 7,428,826 B2 | 9/2008 | Oshitani et al. |
| 7,757,514 B2 | 7/2010 | Oshitani et al. |
| 7,841,193 B2 | 11/2010 | Nishida et al. |
| 8,047,018 B2 | 11/2011 | Ikegami et al. |
| 8,186,180 B2 | 5/2012 | Oshitani et al. |
| 8,434,324 B2 | 5/2013 | Nishino et al. |
| 8,783,060 B2 | 7/2014 | Nishijima et al. |
| 2003/0131611 A1* | 7/2003 | Oshitani ............ B60H 1/00885 62/90 |
| 2005/0155374 A1* | 7/2005 | Oshitani ................ F25B 41/00 62/500 |
| 2006/0156745 A1* | 7/2006 | Ikegami .................. F25B 5/00 62/170 |
| 2006/0254308 A1 | 11/2006 | Yokoyama et al. |
| 2007/0000262 A1 | 1/2007 | Ikegami et al. |
| 2008/0041079 A1* | 2/2008 | Nishijima ................ F25B 5/00 62/191 |
| 2008/0098757 A1* | 5/2008 | Takeuchi ................ F25B 41/00 62/217 |
| 2009/0095003 A1 | 4/2009 | Nagano et al. |
| 2010/0162751 A1* | 7/2010 | Nishijima ................ F25B 1/10 62/500 |
| 2010/0319393 A1 | 12/2010 | Ikegami et al. |
| 2011/0167851 A1 | 7/2011 | Nishijima et al. |
| 2016/0186783 A1* | 6/2016 | Nishijima ................ F04F 5/20 62/500 |
| 2016/0280041 A1* | 9/2016 | Suzuki ............... B60H 1/00921 |
| 2017/0045269 A1* | 2/2017 | Ogata ....................... F25B 1/00 |

\* cited by examiner

MULTI-ZONE TRANSPORT REFRIGERATION SYSTEM WITH AN EJECTOR SYSTEM

FIELD

The embodiments described herein are directed to a multi-zone transport refrigeration system (MTRS) for a refrigerated transport unit. More particularly, the embodiments described herein relate to methods and systems for a MTRS with an ejector system.

BACKGROUND

A transport refrigeration system (TRS) is generally used to control an environmental condition (e.g., temperature, humidity, air quality, and the like) within a transport unit (e.g., a container (such as a container on a flat car, an intermodal container, etc.), a truck, a box car, or other similar transport unit). In some embodiments, the transport unit can include a plurality of zones and the TRS can be a multi-zone TRS (MTRS) that is configured to provide independent climate control to each of the plurality of zones within the transport unit.

SUMMARY

The embodiments described herein are directed to a multi-zone transport refrigeration system (MTRS) for a refrigerated transport unit. More particularly, the embodiments described herein relate to methods and systems for a MTRS with an ejector system.

The embodiments described herein can improve the performance of the MTRS. In particular, the embodiments described herein can improve the cooling capacity of the MTRS, especially at low temperature conditions in the cargo space of the transport unit. An ejector system can be placed upstream of a compressor of the MTRS and downstream of two or more remote evaporator units of the MTRS. The ejector system can be operated based on a saturation pressure difference between remote evaporator units to raise an overall pressure of the refrigerant entering a suction port of the compressor. That is, a suction density of the refrigerant entering the compressor can be increased which thereby increases a mass flow rate of the MTRS.

In one embodiment, a system for a MTRS with an ejector system is provided. The system can include a refrigeration circuit that has a compressor, a first heat exchanger downstream of the compressor, first and second heat exchange units downstream of the first heat exchanger, and an ejector system downstream of the first and second heat exchange units and upstream of the compressor. The first heat exchange unit provides independent climate control to a first zone of the transport unit. The second heat exchange unit provides independent climate control to a second zone of the transport unit. The ejector system mixes refrigerant exiting the first heat exchange unit with refrigerant exiting the second heat exchange unit, increases the pressure of the mixed refrigerant, and directs the mixed refrigerant to the compressor.

In another embodiment, a method for operating a multi-zone transport refrigeration system for a transport unit having a plurality of zones is provided. The method includes obtaining a first evaporator outlet data of refrigerant from a first heat exchange unit evaporator. The method also includes obtaining a second evaporator outlet data of refrigerant from a second heat exchange unit evaporator. Also, the method includes comparing the first evaporator outlet data with the second evaporator outlet data. Further, the method includes, when the first evaporator outlet data is greater than the second evaporator outlet data, directing refrigerant from the first heat exchange unit to a primary inlet of an ejector system and directing refrigerant from the second heat exchange unit to a secondary inlet of the ejector system. Moreover, the method includes, when the first evaporator outlet data is less than the second evaporator outlet data, directing refrigerant from the second heat exchange unit to a primary inlet of an ejector system and directing refrigerant from the first heat exchange unit to a secondary inlet of the ejector system. Also, the method includes the ejector system mixing refrigerant from the primary inlet with refrigerant of the secondary inlet, increasing the pressure of the mixed refrigerant, and directing the mixed refrigerant towards a suction port of a compressor of the multi-zone transport refrigeration system.

In yet another embodiment, a refrigerated transport unit is provided. The refrigerated transport unit includes a transport unit having a plurality of zones, and a multi-zone transport refrigeration system that provides independent climate control for each of the plurality of zones. The multi-zone transport refrigeration system includes a refrigeration circuit. The refrigeration circuit includes a compressor, a first heat exchanger downstream of the compressor, first and second heat exchange units downstream of the first heat exchanger, and an ejector system downstream of the first and second heat exchange units and upstream of the compressor. The first heat exchange unit provides independent climate control to a first zone of the transport unit. The second heat exchange unit provides independent climate control to a second zone of the transport unit. The ejector system mixes refrigerant exiting the first heat exchange unit with refrigerant exiting the second heat exchange unit, increases the pressure of the mixed refrigerant, and directs the mixed refrigerant to the compressor.

Other features and aspects will become apparent by consideration of the following detailed description and accompanying drawings.

BRIEF DESCRIPTION OF THE DRAWINGS

References are made to the accompanying drawings that form a part of this disclosure and which illustrate the embodiments in which systems and methods described in this specification can be practiced.

Like reference numbers represent like parts throughout.

DETAILED DESCRIPTION

The embodiments described herein are directed to a multi-zone transport refrigeration system (MTRS) for a refrigerated transport unit. More particularly, the embodiments described herein relate to methods and systems for a MTRS with an ejector system.

The embodiments described herein can improve the performance of the MTRS. In particular, the embodiments described herein can improve the cooling capacity of the MTRS, especially at low temperature conditions in the cargo space of the transport unit. An ejector system can be placed upstream of a compressor of the MTRS and downstream of two or more remote evaporator units of the MTRS. The ejector system can be operated based on a saturation pressure difference between remote evaporator units to raise an overall pressure of the refrigerant entering a suction port of the compressor. That is, a suction density of the refrigerant entering the compressor can be increased which thereby increases a mass flow rate of the MTRS.

An ejector system, as defined herein, can include one or more ejectors either in parallel or in series. The ejector system can include, for example, two or more fluid inlets and a single fluid outlet.

References are made to the accompanying drawings that form a part hereof, and in which is shown by way of illustration of the embodiments in which the methods and systems described herein may be practiced.

A TRS is generally used to control an environmental condition (e.g., temperature, humidity, air quality, and the like) within a transport unit (e.g., a container (such as a container on a flat car, an intermodal container, etc.), a truck, a box car, or other similar transport unit). The transport unit can include a plurality of zones and the TRS can be a multi-zone TRS (MTRS). Each zone may require a climate condition (e.g., temperature, humidity, air quality, etc.) that is different from other zone(s). The MTRS can be configured to provide independent climate control to each of the plurality of zones within the transport unit.

The MTRS may have one host unit and one or more remote units (together referred to herein as heat exchanger units) that are each configured to provide climate control to each of the one or more zones within the multi-zone transport unit. That is, the MTRS can maintain different climate conditions within different zones of the transport unit. A TRU of the MTRS may include a compressor, an expansion valve, a first heat exchanger (e.g., condenser), and a host unit. The host unit can include a second heat exchanger (e.g., a host evaporator), one or more blower(s) or fan(s) for providing climate control within the particular zone the host unit is located, one or more flow regulating devices (e.g., solenoid valve(s), etc.) for controlling the amount of refrigerant flow into the host unit, and one or more throttling devices (e.g., electronic throttling valve(s), etc.) for controlling the amount of refrigerant flow available to a suction end of the compressor of the MTRS.

Each remote unit may have a remote heat exchanger (e.g., a remote evaporator), one or more blower(s) or fan(s) for providing climate control within the particular zone the host unit is located, one or more flow regulating devices (e.g., solenoid valve(s), etc.) for controlling the amount of refrigerant flow into the host unit, and one or more throttling devices (e.g., electronic throttling valve(s), etc.) for controlling the amount of refrigerant flow available to a suction end of the compressor of the MTRS. Each remote unit can be connected to the TRU via a common refrigerant line. One remote unit may be used to provide climate control for one zone of the transport unit.

The MTRS includes a refrigeration circuit and a controller (e.g., a MTRS controller) that is configured to manage, command, direct, and regulate the behavior of one or more components of the refrigeration circuit (e.g., an evaporator, a condenser, a compressor, an expansion device, etc.). The MTRS controller can also be configured to manage, command, direct, and regulate the behavior of the host unit and the one or more remote units. The MTRS generally may be a vapor-compressor type refrigeration system, or any other suitable refrigeration system that can use refrigerant, cold plate technology, etc.

Figure 1:
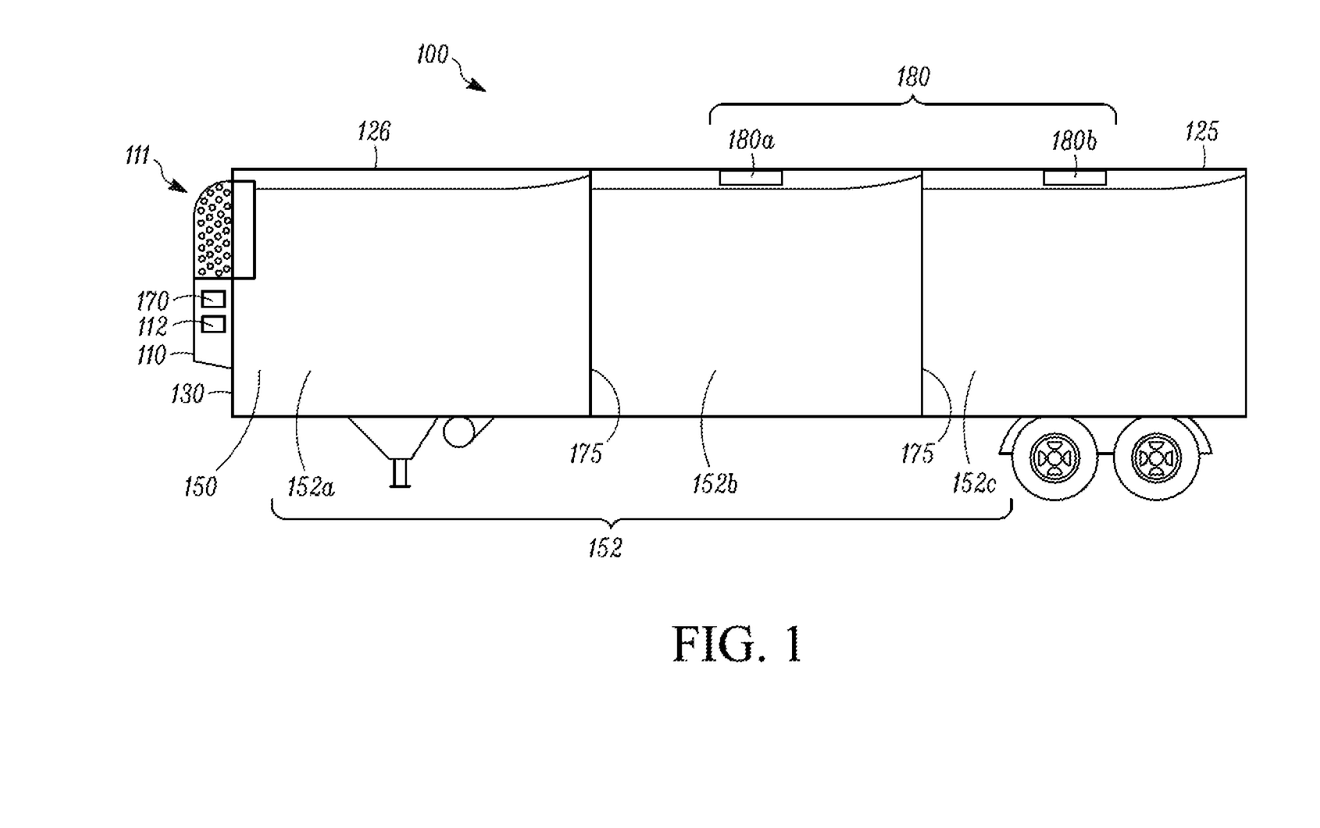
FIG. 1 illustrates a schematic cross sectional side view of a refrigerated transport unit with a MTRS.

FIG. 1 illustrates one embodiment of a MTRS 100 for a transport unit (TU) 125 that can be towed, for example, by a tractor (not shown). The MTRS 100 includes a transport refrigeration unit (TRU) 110 that provides environmental control (e.g. temperature, humidity, air quality, etc.) within an internal space 150 of the TU 125. The MTRS 100 also includes a MTRS controller 170 and one or more sensors (not shown) that are configured to measure one or more parameters of the MTRS 100 and communicate parameter data to the MTRS controller 170. The MTRS 100 is powered by a power source 112. The TRU 110 is disposed on a front wall 130 of the TU 125. In other embodiments, it will be appreciated that the TRU 110 can be disposed, for example, on a rooftop 126 or another wall of the TU 125.

The TU 125 shown in FIG. 1 is a trailer unit. However, it will be appreciated that the embodiments described herein are not limited to trucks and trailer units, but can apply to any other type of transport unit including, but not limited to, a container (such as a container on a flat car, an intermodal container, etc.), a truck, a box car, or other similar transport unit.

The programmable MTRS Controller 170 may comprise a single integrated control unit or may comprise a distributed network of TRS control elements. The number of distributed control elements in a given network can depend upon the particular application of the principles described herein. The MTRS controller 170 is configured to control operation of the MTRS 100.

As shown in FIG. 1, the power source 112 is disposed in the TRU 110. In other embodiments, the power source 112 can be separate from the TRU 110. Also, in some embodiments, the power source 112 can include two or more different power sources disposed within or outside of the TRU 110. In some embodiments, the power source 112 can include a prime mover, a battery, an alternator, a generator, a solar panel, a fuel cell, etc. Also, the prime mover can be a combustion engine such as a two speed engine, a variable speed engine, etc. The power source 112 can provide power to, for example, the MTRS Controller 170, The internal space 150 is divided into a plurality of zones 152. The term "zone" means a part of an area of the internal space 150 separated by walls 175. In some examples, each of the zones 152 can maintain a set of environmental condition parameters (e.g. temperature, humidity, air quality, etc.) that is independent from other zones 152.

Note that in FIG. 1 the internal space 150 is divided into three zones: a first zone 152a; a second zone 152b; and a third zone 152c. Each of the zones 152 shown in FIG. 1 is divided into substantially equal areas. However, it is to be realized that the internal space 150 may be divided into any number of zones in any size configuration that is suitable for environmental control of the different zones.

The MTRS 100 is configured to control and maintain separate environmental condition requirements in each of the zones 152. The MTRS 100 includes a refrigeration circuit (not shown) that fluidly connects a compressor (not shown), a condenser (not shown), an ejector system (not shown), a host unit 111, and a plurality of remote units 180. The TRU 110 includes the compressor, the condenser, the ejector system and the host unit 111. The plurality of remote units 180 is disposed in the TU 125. The refrigeration circuit provides independent climate control for each of the first, second and third zones 152a-c. The host unit 111 provides climate control for the first zone 152a. The first remote unit 180a is disposed in the second zone 152b and provides climate control for the second zone 152b. The second remote unit 180b is disposed in the third zone 152c and provides climate control for the third zone 152c. The host unit 111 and the remote units 180 are collectively referred to herein as heat exchange units. It will be appreciated that in other embodiments the number of heat exchange units can vary based on the number of zones in the transport unit. For example, in a two zone TU, the MTRS can include a host unit for providing climate control to the first zone and a remote unit for providing climate control to the second zone.

In one embodiment, the first zone 152a can be a frozen temperature zone operating to maintain a temperature set point within a frozen temperature range and the second and third zones 152b, 152c can be fresh temperature zones operating to maintain a temperature set point within a fresh temperature range. In one embodiment, for example, the frozen temperature range can be between about −25° F. to about 15° F. and the fresh temperature range can be between about 16° F. to about 90° F. In another embodiment, for example, the frozen temperature range can be between about −25° F. to about 24° F. and the fresh temperature zone can be between about 26° F. to about 90° F. It will be appreciated that in other embodiments, any of the first, second and third zones 152a-c can be a fresh temperature zone operating to maintain a temperature set point within a fresh temperature range or a frozen temperature zone operating to maintain a temperature set point within a frozen temperature range.

Each heat exchanger unit 111, 180a, 180b is fluidly connected to the compressor, the condenser and the ejector system. The host unit 111 and each remote unit 180a, 180b may include one or more heat exchangers (e.g., evaporator(s)), one or more blower(s) or fan(s) for providing climate control within the particular zone the heat exchanger unit is located, one or more flow regulating devices (e.g., solenoid valve(s), etc.) for controlling the amount of refrigerant flow into the heat exchanger unit, and one or more throttling devices (e.g., electronic throttling valve(s), etc.) for controlling the amount of refrigerant flow available to a suction end of the compressor of the MTRS 100. The heat exchange units (e.g., the host unit 111 and each of the remote units 180) can operate in a plurality of operational modes (e.g., a NULL mode, a running NULL mode, a COOL mode, a HEAT mode, a DEFROST mode, a low fan speed mode, a high fan speed mode, a high prime mover speed mode, a low prime mover speed mode, etc.).

In the NULL mode, the MTRS 100 can be configured to prevent refrigerant flow through the heat exchanger unit and stop operation of the fan(s). In the running NULL mode, the MTRS 100 can be configured to prevent refrigerant flow through the heat exchanger unit and continue operation of the fan(s). In the COOL mode, the MTRS 100 can be configured to provide refrigerant flow through the heat exchanger unit and/or allow operation of the fan(s) in order to provide cooling within the respective zone 152 of the transport unit 125. In the HEAT mode, the MTRS 100 can be configured to provide refrigerant flow through the heat exchanger unit and/or allow operation of the fan(s) in order to provide heating within the respective zone 152 of the transport unit 125. In the DEFROST mode, the MTRS 100 can be configured to provide refrigerant flow through the heat exchanger unit and/or allow operation of the fan(s) in order to provide defrosting of one or more refrigeration components of the refrigeration circuit of the MTRS 100. In the low fan speed mode, the MTRS 100 can be configured to operate the fan(s) at a low speed when the fan(s) are two speed or variable speed fan(s). In the high fan speed mode, the MTRS 100 can be configured to operate the fan(s) at a high speed when the fan(s) are two speed or variable speed fan(s). In the low prime mover speed mode, the MTRS 100 can be configured to operate a prime mover of the power source 112 at a low speed when the prime mover is a two speed or variable speed prime mover. In the high prime mover speed mode, the MTRS 100 can be configured to operate a prime mover of the power source 112 at a high speed when the prime mover is a two speed or variable speed prime mover.

Figure 2:
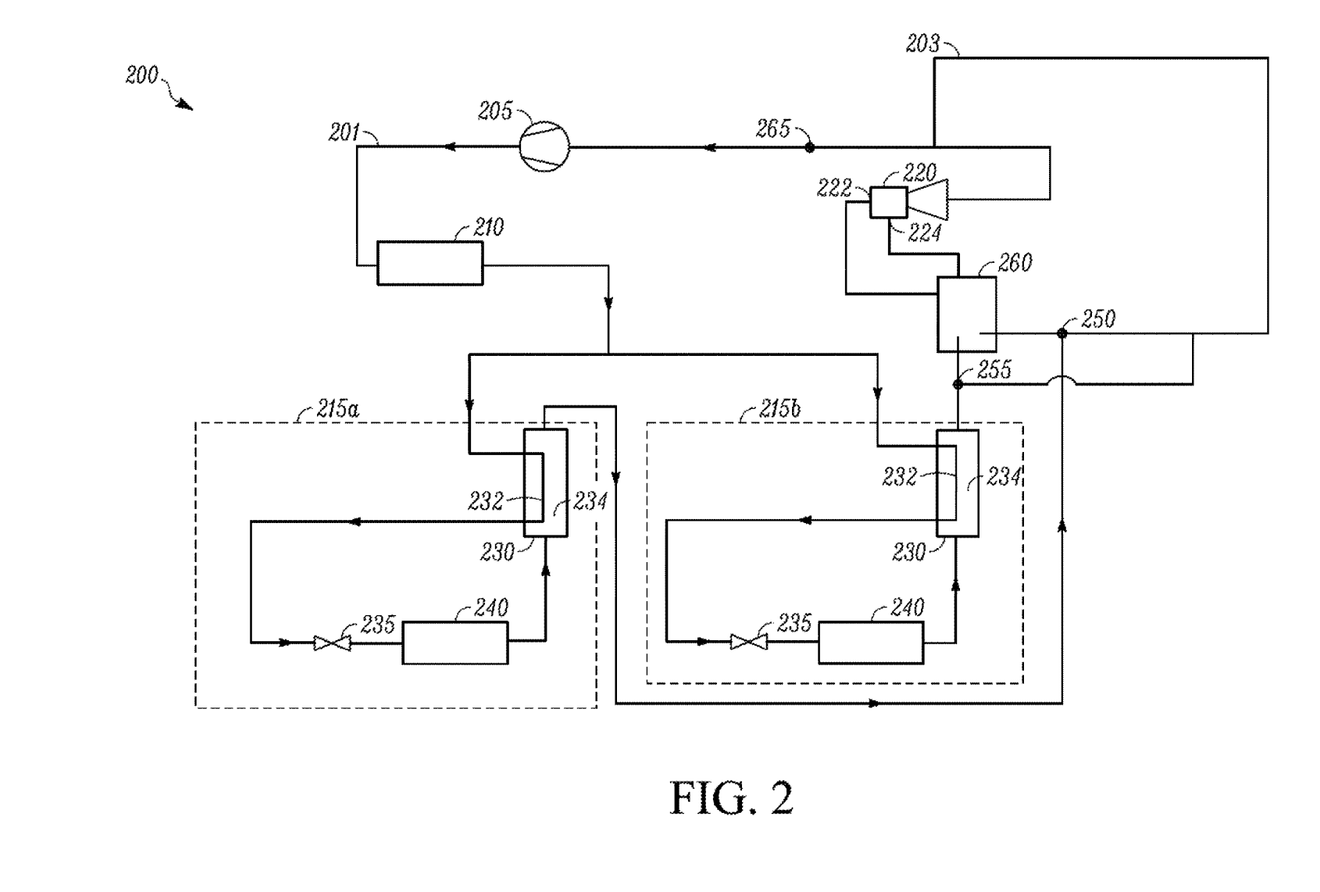
FIG. 2 illustrates a schematic of a refrigeration circuit for a MTRS that includes an ejector system.

FIG. 2 illustrates a schematic of a refrigeration circuit 201 for a MTRS 200 for providing independent climate control to multiple zones in a TU. The MTRS 200 includes two heat exchange units 205a,b for providing climate control within two separate zones of the TU and an ejector system 220. While the embodiment shown in FIG. 2 is directed to a two-zone MTRS, it will be appreciated that the embodiments discussed herein could be applied to provide independent climate control to three or more zones in a TU.

The refrigeration circuit 201 connects a compressor 205, a first heat exchanger (e.g., condenser) 210, a first heat exchange unit 215a, a second heat exchange unit 215b, and the ejector system 220. Each of the heat exchanger units 215a,b includes a suction line heat exchanger 230 with a hot section 232 and a cool section 234 that are in thermodynamic contact with each other, a throttling device 235 and a second heat exchanger (e.g., evaporator) 240. The refrigeration circuit 201 also includes a bypass path 203. It will be appreciated that in some embodiments, the refrigeration circuit 201 does not include the suction line heat exchanger 230.

The refrigeration circuit 201 also includes a first heat exchange unit control valve 250, a second heat exchange unit control valve 255, an ejector system control valve 260 and a compressor control valve 265 that can each be controlled by a controller (e.g., the MTRS Controller 170 shown in FIG. 1). The first heat exchange unit control valve 250 can direct refrigerant exiting the first heat exchange unit 215a to the ejector system control valve 260 in a first position or to the bypass path 203 in a second position. The second heat exchange unit control valve 255 can direct refrigerant exiting the second heat exchange unit 215b to the ejector system control valve 260 in a first position or to the bypass path 203 in a second position. In some embodiments, the first and second heat exchange unit control valves 250, 255 can be three-way valves. Also, in some embodiments, the first and second heat exchange unit control valves 250, 255 can be a single control valve device that can direct refrigerant exiting the first heat exchange unit 215a to either the ejector system control valve 260 or to the bypass path 203 and can also direct refrigerant exiting the second heat exchange unit 215b to either the ejector system control valve 260 or to the bypass path 203.

The ejector system control valve 260 can direct refrigerant from the first heat exchange unit control valve 250 to a primary inlet 222 of the ejector system 220 and direct refrigerant from the second heat exchange unit control valve 255 to a secondary inlet 222 of the ejector system 220 in a first position, and can direct refrigerant from the second heat exchange unit control valve 255 to the primary inlet 222 and direct refrigerant from the first heat exchange unit control valve 250 to the secondary inlet 224 in a second position. In some embodiments, the ejector system control valve 260 can be a four-way valve. In other embodiments, the ejector system control valve 260 can be a combination of two three-way valves. Details of one embodiment of an ejector system, such as the ejector system 220, are discussed below with respect to FIG. 3.

The compressor control valve 265 directs and controls the amount of refrigerant directed from the bypass path 203 or the ejector system 220 to the compressor 205. In some embodiments, the compressor control valve 265 can be a pressure regulator valve that can control the pressure of refrigerant directed to the compressor 205 to protect the compressor 205 and/or the power source providing power to the compressor.

Also, the MTRS can include a plurality of sensors (not shown) that can monitor, for example, an evaporator outlet pressure at each of the second heat exchangers 240, an evaporator outlet saturation temperature at each of the second heat exchangers 240, a compressor gas outlet pressure, a compressor gas outlet saturation temperature, a compressor gas inlet pressure, a compressor gas inlet saturation temperature, a prime mover coolant temperature, a zone temperature in each of the multiple zones of the TU, an ejector system outlet pressure, an ejector system outlet saturation temperature, a compressor revolutions per minute (RPM), an ambient temperature outside of the TU, etc.

In operation, a refrigerant is directed from the compressor 205 to the condenser 210. The compressor 205 can take refrigerant in the form of saturated vapor and compress the refrigerant to a higher pressure and temperature. The refrigerant in the form of hot compressed vapor can then pass through the condenser 210 where heat from the refrigerant can be rejected out of the MTRS 200 and the refrigerant can be cooled. From the condenser 210, the condensed refrigerant can travel to the first heat exchange unit 215a or the second heat exchange unit 215b.

In either of the heat exchange units 215a,b, the condensed refrigerant first passes through the hot section 232 of the suction line heat exchanger 230 before passing through the throttling device 235. The throttling device 235 reduces the pressure and the temperature of the condensed refrigerant. The cold refrigerant that can include a liquid and vapor mixture is then routed through the evaporator 240 whereby a heat exchange occurs between the cold refrigerant and air circulating within the internal space of the respective zone of the multi-zone TU to cool the respective zone. Once passed through the evaporator 240, the refrigerant returns to a saturated vapor and passes through the cool section 234 of the suction line heat exchanger 230 to perform a heat exchange with the condensed refrigerant passing through the hot section 232 of the suction line heat exchanger 230. The saturated vapor refrigerant then exits the respective heat exchange unit 215a,b. Any saturated vapor refrigerant exiting the first heat exchange unit 215a is directed to the control valve first heat exchange unit 250 and any saturated vapor refrigerant exiting the second heat exchange unit 215b is directed to the second heat exchange unit control valve 255. It will be appreciated that in some embodiments, the first and second heat exchange units 215a,b can include one or more flow regulating devices (e.g., solenoid valves, check valves, etc.) to direct the flow and/or restrict the direction of flow of refrigerant through the first and second heat exchange units 215a,b and to the first heat exchange unit 250 and the second heat exchange unit 255 respectively.

The controller determines whether to direct the saturated vapor refrigerant through the ejector system 220 or the bypass path 203 before travelling to the compressor control valve 265. The controller also determines how much of the saturated vapor refrigerant is directed to the compressor 205.

In some embodiments, the MTRS 200 can be required to maintain different climate conditions, including temperature, for separate zones of the transport unit. The difference in climate conditions can require the first and second heat exchange units 215a,b to operate at different saturation pressures which can create a huge variation in suction pressure of the compressor 205. In these instances, the ejector system 220 can prevent reduction of a mass flow rate and thereby a reduction in cooling capacity of the MTRS 200 as temperature decreases within the multiple zones of the transport unit. That is, the ejector system 220 can improve compressor suction pressure and thereby improve cooling capacity of the MTRS 200. Operation of the MTRS 200 is discussed in further detail below with respect to FIGS. 4A and 4B.

Figure 3:
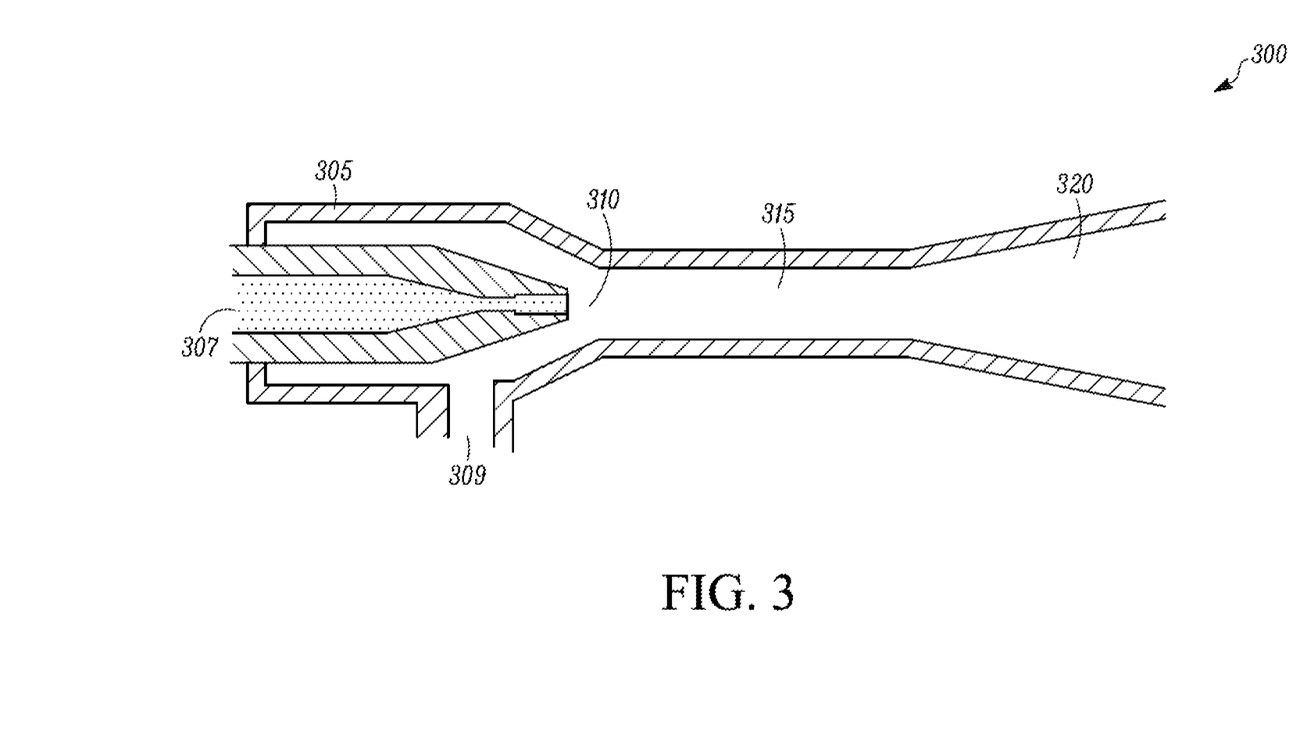
FIG. 3 illustrates one embodiment of an ejector system that can be used in the refrigeration circuit of FIG. 2.

FIG. 3 illustrates one embodiment of an ejector system 300 that can be used with the embodiments described herein. The ejector system 300 can mix refrigerant at two different pressures to have a similar pressure and then increase the pressure of the mixed refrigerant so that the refrigerant exiting the ejector system 300 can have less variation in pressure while still retaining a high enough pressure to exit in a vapor form. The ejector system 300 includes nozzle section 305, a mixing section 310, a throat section 315, and a diffuser section 320. The nozzle section 305 is configured to receive refrigerant at two different pressures and includes a primary inlet 307 and a secondary inlet 309. The primary inlet 307 is configured to receive a first refrigerant that is at a first pressure and the secondary inlet 309 is configured to receive a second refrigerant at a second pressure that is lower than the first pressure. The mixing section 310 mixes the first and second refrigerant such that the mixture can have a somewhat homogenous pressure that is lower than the first pressure. The mixed refrigerant then passes through the throat section 315 whereby the pressure of the mixed refrigerant is increased. The increased pressure refrigerant then passes through the diffuser section 320 whereby the pressure of the refrigerant is gradually increased (e.g., gradually increased close to the first pressure) before exiting out of the ejector system 300 in a vapor form.

Figure 4A:
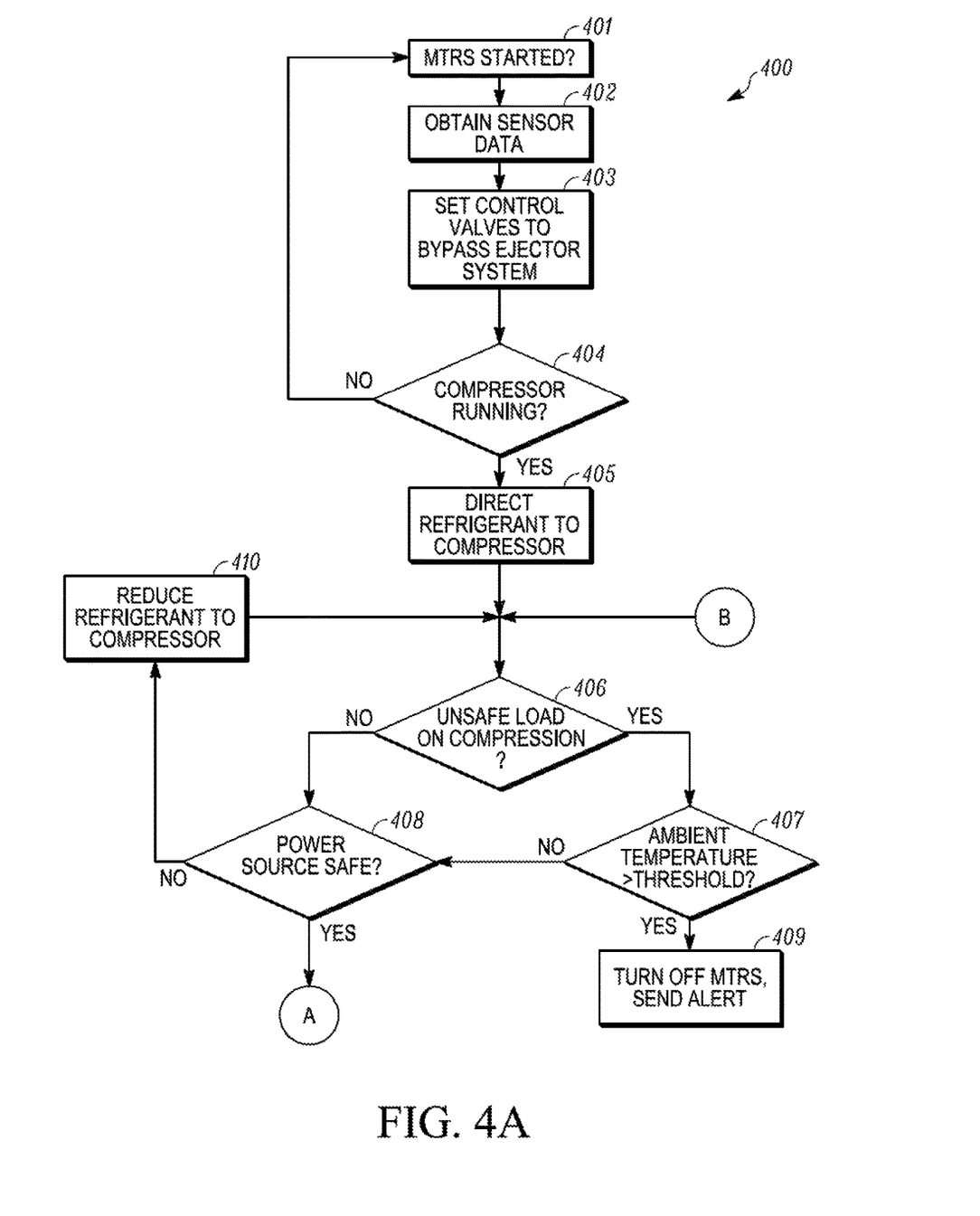
FIGS. 4A and 4B illustrate one embodiment of a method for operating the MTRS shown in FIG. 2.
Figure 4B:
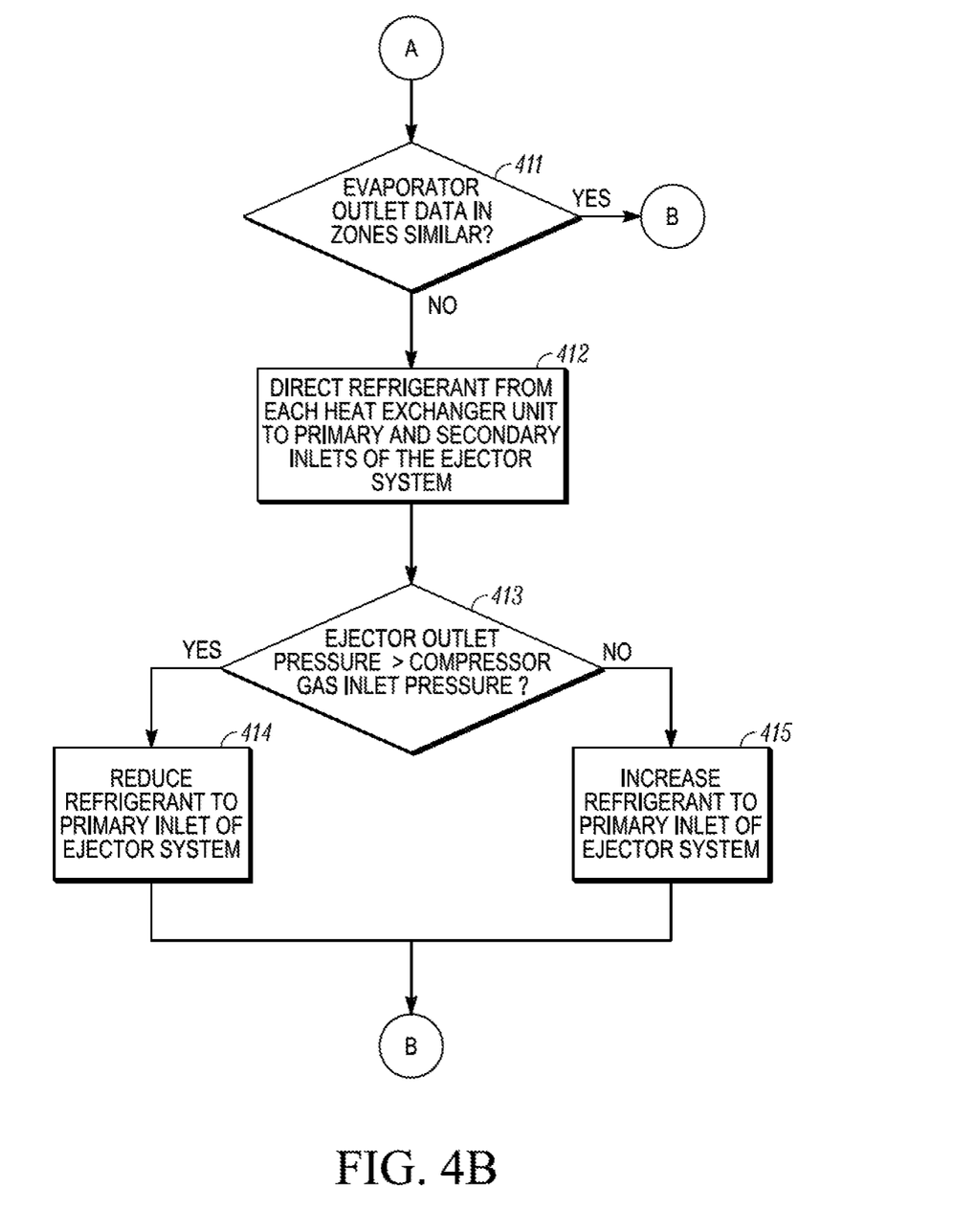

FIGS. 4A and 4B illustrate a flowchart of a method 400 for operating the MTRS 200 shown in FIG. 2, according to one embodiment. The method 400 starts at 401 whereby the controller determines whether the MTRS 200 is started. In some embodiments, this includes the controller determining whether a power source (e.g., prime mover, battery source, etc.) is providing power to the MTRS 200. The method 400 then proceeds to 402. At 402, the controller obtains sensor data from the plurality of sensors of the MTRS 200. The sensor data can include, for example, an evaporator outlet pressure at each of the second heat exchangers 240, an evaporator outlet saturation temperature at each of the second heat exchangers 240, a compressor gas outlet pressure, a compressor gas outlet saturation temperature, a compressor gas inlet pressure, a compressor gas inlet saturation temperature, a prime mover coolant temperature, a zone temperature in each of the multiple zones of the TU, an ejector system outlet pressure, an ejector system outlet saturation temperature, a compressor RPM, an ambient temperature outside of the TU, etc. At 403, the controller instructs the first and second heat exchange unit control valves 250, 255 to direct refrigerant away from the ejector system 220 along the bypass path 203.

At 404, the controller determines whether the compressor 205 is running. If the controller determines that the compressor 205 is running, the method 400 proceeds to 405. If the controller determines that the compressor 205 is not running, the method 400 returns back to 401. At 405, the controller instructs the compressor control valve 265 to direct refrigerant to the compressor 205 via the bypass path 203. In some embodiments, the controller can instruct the compressor control valve 265 to open partially to control the amount of refrigerant that is directed to the compressor 205 to allow the compressor 205 to safely startup. In one embodiment, the controller can instruct the compressor control valve 265 to open about 75% for two to three minutes to allow the compressor 205 to gradually startup. The method 400 then proceeds to 406.

At 406, the controller determines whether there is an unsafe load demand from the heat exchange units 215a,b on the compressor 205. In some embodiments, this can be determined based on compressor gas outlet pressure data and compressor gas inlet pressure data obtained, for example, by one or more sensors of the MTRS 200. For example, in one embodiment the controller can determine whether there is an unsafe load demand on the compressor 205 by comparing a ratio of the compressor gas outlet pressure and the compressor gas inlet pressure to a compressor gas pressure threshold. If the controller determines that there is an unsafe load demand on the compressor 205, the method 400 proceeds to 407. If the controller determines that there is a safe load demand on the compressor 205, the method 400 proceeds to 408.

At 407, the controller determines whether the ambient temperature outside of the TU is greater than an ambient temperature threshold. The ambient temperature threshold can be, for example, an extreme temperature condition that can result in the unsafe load demand on the compressor 205 to provide climate control within the TU. For example, in some embodiments, the ambient temperature threshold can be ~135° F. The ambient temperature can be obtained, for example, from an ambient temperature sensor located on the TU. If the controller determines that the ambient temperature is greater than the ambient temperature threshold, the method 400 proceeds to 409. If the ambient temperature is less than or equal to the ambient temperature threshold, the method 400 proceeds to 408.

At 409, the controller instructs the MTRS 200 to shut off and sends an alert notifying the driver, customer, etc. that the MTRS 200 has been turned off. Turning off the MTRS 200 can include, for example, the power source of the MTRS 200 stopping power from being sent to the compressor 205 and/or other mechanically or electrically powered devices of the MTRS 200.

At 408, the controller determines whether the power source of the MTRS 200 is operating safely. In some embodiments, when the power source of the MTRS 200 is a prime mover, the controller can obtain, for example, prime mover coolant water outlet temperature data and prime mover coolant trip off temperature data. Based on the prime mover coolant water outlet temperature data and the prime mover coolant trip off temperature data, the controller can determine whether the prime mover is operating safely. If the controller determines that the power source of the MTRS 200 is operating safely, the method 400 proceeds to A. If the controller determines that the power source of the MTRS 200 is not operating safely, the method 400 proceeds to 410.

At 410, the controller controls the compressor control valve 265 to reduce the amount of refrigerant directed to a suction inlet of the compressor 205. This can reduce the load on the compressor 205 and allow the power source of the MTRS 200 to operate under safer conditions. The method 400 then proceeds back to 406.

Turning to FIG. 4B, at A the method 400 proceeds to 411. At 411, the controller obtains evaporator outlet data from each of the two zones of the TU and determines whether the evaporator outlet data at each of the two zones are substantially similar. In some embodiments, the evaporator outlet data can be evaporator outlet pressure data. In other embodiments, the evaporator outlet data can be evaporator outlet saturation temperature data.

For example, in some embodiments, the evaporator outlet pressure can be substantially similar if they are within ~1 psia. In other embodiments, the evaporator outlet pressure can be substantially similar if they are within ~2 psia. In yet some other embodiments, the evaporator outlet saturation temperature can be substantially similar if they are within ~2° C.

If the controller determines that the evaporator outlet data at each of the two zones are substantially similar, the method 400 proceeds to B and refrigerant is directed along the bypass path 203 to bypass the ejector system 220. As shown in FIG. 4A, at B, the method 400 proceeds to 406. If the controller determines that the evaporator outlet data at each of the two zones are not substantially similar, the method 400 proceeds to 412.

At 412, the controller directs refrigerant exiting the first heat exchange unit 215a and refrigerant exiting the second heat exchange unit 215b to separate inlets of the ejector system 220. In particular, the controller controls the first heat exchange unit control valve 250 to direct refrigerant from the first heat exchange unit 215a to the control valve 260 and controls the second heat exchange unit control valve 255 to direct refrigerant form the second heat exchange unit 215b to the ejector system control valve 260. The ejector system control valve 260 then directs the refrigerant from the heat exchange unit 215a or 215b having a higher evaporator outlet data to the primary inlet 222 of the ejector system 220 and the other refrigerant from the heat exchange unit 215a or 215b having the lower evaporator outlet data to the secondary inlet 224 of the ejector system 220. For example, if the evaporator outlet data of the first heat exchange unit 215a is higher than the evaporator outlet data of the second heat exchange unit 215b, the controller controls the ejector system control valve 260 to direct the refrigerant from the first heat exchange unit 215a towards the primary inlet 222 of the ejector system 220 and to direct the refrigerant from the second heat exchange unit 215b towards the secondary inlet 224 of the ejector system 220. In contrast, if the evaporator outlet data of the second heat exchange unit 215b is higher than the evaporator outlet data of the first heat exchange unit 215a, the controller controls the ejector system control valve 260 to direct the refrigerant from the second heat exchange unit 215b towards the primary inlet 222 of the ejector system 220 and to direct the refrigerant from the first heat exchange unit 215a towards the secondary inlet 224 of the ejector system 220. The method 400 then proceeds to 413.

At 413, the controller determines whether an ejector system outlet pressure of the refrigerant exiting the ejector system 220 is greater than a compressor gas inlet pressure. If the controller determines that the ejector system outlet pressure is greater than the compressor gas inlet pressure, the controller at 414 reduces the amount of refrigerant directed to the primary inlet 222 of the ejector system 220. If the controller determines that the ejector system outlet pressure is not greater than the compressor gas inlet pressure, the controller at 415 increases the amount of refrigerant directed to the primary inlet 222 of the ejector system 220. The method 400 then proceeds to B.

Aspects:

It will be appreciated that any of aspects 1-6, 7-13, and 14-19 can be combined.

Aspect 1. A multi-zone transport refrigeration system for a transport unit having a plurality of zones, the system comprising:
- a refrigeration circuit that includes:
  - a compressor,
  - a first heat exchanger downstream of the compressor,
  - a first heat exchange unit downstream of the first heat exchanger, wherein the first heat exchange unit provides independent climate control to a first zone of the plurality of zones of the transport unit,
  - a second heat exchange unit downstream of the first heat exchanger, wherein the second heat exchange unit provides independent climate control to a second zone of the plurality of zones of the transport unit, and
  - an ejector system downstream of both the first heat exchange unit and the second heat exchange unit and upstream of the compressor, wherein the ejector system mixes refrigerant exiting the first heat exchange unit with refrigerant exiting the second heat exchange unit, increases the pressure of the mixed refrigerant, and directs the mixed refrigerant to the compressor.

Aspect 2. The system of aspect 1, wherein the refrigeration circuit includes a bypass path directs refrigerant from the first heat exchange unit and the second heat exchange unit to the compressor and bypasses the ejector system.

Aspect 3. The system of aspect 2, wherein the refrigeration circuit includes a first heat exchange unit control valve that directs refrigerant from the first heat exchange unit towards the ejector system in a first position and directs refrigerant from the first heat exchange unit towards the bypass path in a second position, and a second heat exchange unit control valve that directs refrigerant from the second heat exchange unit towards the ejector system in a first position and directs refrigerant from the second heat exchange unit towards the bypass path in a second position.

Aspect 4. The system of either one of aspects 2 and 3, wherein the refrigeration circuit includes an ejector system control valve that directs refrigerant from one of the first heat exchange unit and the second heat exchange unit to a primary inlet of the ejector system and directs refrigerant from the other of the first heat exchange unit and the second heat exchange unit to a secondary inlet of the ejector system.

Aspect 5. The system of any one of aspects 2-4, further comprising a controller that compares a first heat exchanger unit evaporator outlet data of refrigerant exiting the first heat exchange unit with a second heat exchanger unit evaporator outlet data of refrigerant exiting the second heat exchange unit, directs refrigerant from the first heat exchange unit and the second heat exchange unit to the bypass path when the first heat exchange unit evaporator outlet data is substantially similar to the second heat exchange unit evaporator outlet data, and directs refrigerant from the first heat exchange unit and the second heat exchange unit to the ejector system when the first heat exchange unit evaporator outlet data is not substantially similar to the second heat exchange unit evaporator outlet data.

Aspect 6. The system of aspect 5, wherein when the first heat exchange unit evaporator outlet data is not substantially similar to the second heat exchange unit evaporator outlet data, the controller:
- directs refrigerant from one of the first heat exchange unit and the second heat exchange unit having a higher evaporator outlet data to a primary inlet of an ejector system;
- directing refrigerant from the other of the first heat exchange unit and the second heat exchange unit to a secondary inlet of the ejector system; and
- the ejector system mixing refrigerant from the primary inlet with refrigerant of the secondary inlet, increasing the pressure of the mixed refrigerant, and directing the mixed refrigerant towards a suction port of the compressor.

Aspect 7. A method for operating a multi-zone transport refrigeration system for a transport unit having a plurality of zones, the method comprising:
- obtaining a first evaporator outlet data of refrigerant from a first heat exchange unit evaporator;
- obtaining a second evaporator outlet data of refrigerant from a second heat exchange unit evaporator;
- comparing the first evaporator outlet data with the second evaporator outlet data;
- when the first evaporator outlet data is greater than the second evaporator outlet data, directing refrigerant from the first heat exchange unit to a primary inlet of an ejector system and directing refrigerant from the second heat exchange unit to a secondary inlet of the ejector system;
- when the first evaporator outlet data is less than the second evaporator outlet data, directing refrigerant from the second heat exchange unit to a primary inlet of an ejector system and directing refrigerant from the first heat exchange unit to a secondary inlet of the ejector system; and
- the ejector system mixing refrigerant from the primary inlet with refrigerant of the secondary inlet, increasing the pressure of the mixed refrigerant, and directing the mixed refrigerant towards a suction port of a compressor of the multi-zone transport refrigeration system.

Aspect 8. The method of aspect 7, further comprising directing refrigerant from the first heat exchange unit and the second heat exchange unit along a bypass path that bypasses the ejector system to the suction port when the first evaporator outlet data is substantially similar to the second evaporator outlet data.

Aspect 9. The method of aspect 8, wherein directing refrigerant from the first heat exchange unit and the second heat exchange unit along the bypass path includes a controller instructing both a first heat exchange unit control valve and a second heat exchange unit control valve to operate in a second condition.

Aspect 10. The method of any one of aspects 7-9, wherein directing refrigerant from the first heat exchange unit to the primary inlet and directing refrigerant from the second heat exchange unit to the secondary inlet includes a controller instructing an ejector system control valve of the multi-zone transport refrigeration system to operate in a first position, and
wherein directing refrigerant from the second heat exchange unit to the primary inlet and directing refrigerant from the first heat exchange unit to the secondary inlet includes the controller instructing the ejector system control valve to operate in a second position.

Aspect 11. The method of any one of aspects 7-10, further comprising:
  determining whether a power source that supplies power to the compressor is operating safely, and
  reducing the amount of refrigerant directed to the compressor when the power source is not operating safely.

Aspect 12. The method of any one of aspects 7-11, further comprising:
  determining whether there is an unsafe load on the compressor;
  determining whether an ambient temperature of air surrounding the transport unit is greater than an ambient temperature threshold; and
  turning off the multi-zone transport refrigeration system when it is determined that there is an unsafe load on the compressor and it is determined that the ambient temperature is greater than the ambient temperature threshold.

Aspect 13. The method of any one of aspects 7-12, wherein directing refrigerant from the first heat exchange unit to the primary inlet and directing refrigerant from the second heat exchange unit to the secondary inlet includes a controller instructing an ejector system valve to operate in a first position, and
  wherein directing refrigerant from the second heat exchange unit to the primary inlet and directing refrigerant from the first heat exchange unit to the secondary inlet includes the controller instructing the ejector system valve to operate in a second position.

Aspect 14. A refrigerated transport unit comprising:
  a transport unit having a plurality of zones; and
  a multi-zone transport refrigeration system that provides independent climate control for each of the plurality of zones, the multi-zone transport refrigeration system including:
    a refrigeration circuit that includes:
      a compressor,
      a first heat exchanger downstream of the compressor,
      a first heat exchange unit downstream of the first heat exchanger, wherein the first heat exchange unit provides independent climate control to a first zone of the plurality of zones of the transport unit,
      a second heat exchange unit downstream of the first heat exchanger, wherein the second heat exchange unit provides independent climate control to a second zone of the plurality of zones of the transport unit, and
      an ejector system downstream of both the first heat exchange unit and the second heat exchange unit and upstream of the compressor, wherein the ejector system mixes refrigerant exiting the first heat exchange unit with refrigerant exiting the second heat exchange unit, increases the pressure of the mixed refrigerant, and directs the mixed refrigerant to the compressor.

Aspect 15. The refrigerated transport unit of aspect 14, wherein the refrigeration circuit includes a bypass path directs refrigerant from the first heat exchange unit and the second heat exchange unit to the compressor and bypasses the ejector system.

Aspect 16. The refrigerated transport unit of aspect 15, wherein the refrigeration circuit includes a first heat exchange unit control valve that directs refrigerant from the first heat exchange unit towards the ejector system in a first position and directs refrigerant from the first heat exchange unit towards the bypass path in a second position, and a second heat exchange unit control valve that directs refrigerant from the second heat exchange unit towards the ejector system in a first position and directs refrigerant from the second heat exchange unit towards the bypass path in a second position.

Aspect 17. The refrigerated transport unit of either one of aspects 15 and 16, wherein the multi-zone transport system includes a controller that compares a first heat exchanger unit evaporator outlet data of refrigerant exiting the first heat exchange unit with a second heat exchanger unit evaporator outlet data of refrigerant exiting the second heat exchange unit, directs refrigerant from the first heat exchange unit and the second heat exchange unit to the bypass path when the first heat exchange unit evaporator outlet data is substantially similar to the second heat exchange unit evaporator outlet data, and directs refrigerant from the first heat exchange unit and the second heat exchange unit to the ejector system when the first heat exchange unit evaporator outlet data is not substantially similar to the second heat exchange unit evaporator outlet data.

Aspect 18. The refrigerated transport unit of aspect 17, wherein when the first heat exchange unit evaporator outlet data is not substantially similar to the second heat exchange unit evaporator outlet data, the controller:
  directs refrigerant from one of the first heat exchange unit and the second heat exchange unit having a higher evaporator outlet data to a primary inlet of an ejector system;
  directing refrigerant from the other of the first heat exchange unit and the second heat exchange unit to a secondary inlet of the ejector system; and
  the ejector system mixing refrigerant from the primary inlet with refrigerant of the secondary inlet, increasing the pressure of the mixed refrigerant, and directing the mixed refrigerant towards a suction port of the compressor.

Aspect 19. The refrigerated transport unit of any one of aspects 14-18, wherein the refrigeration circuit includes an ejector system control valve that directs refrigerant from one of the first heat exchange unit and the second heat exchange unit to a primary inlet of the ejector system and directs refrigerant from the other of the first heat exchange unit and the second heat exchange unit to a secondary inlet of the ejector system.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A multi-zone transport refrigeration system for a transport unit having a plurality of zones, the system comprising:
a refrigeration circuit that includes:
a compressor,
a first heat exchanger downstream of the compressor,
a first heat exchange unit downstream of the first heat exchanger, wherein the first heat exchange unit provides independent climate control to a first zone of the plurality of zones of the transport unit,
a second heat exchange unit downstream of the first heat exchanger, wherein the second heat exchange unit provides independent climate control to a second zone of the plurality of zones of the transport unit, and
an ejector system downstream of both the first heat exchange unit and the second heat exchange unit and upstream of the compressor, wherein the ejector system mixes refrigerant exiting the first heat exchange unit with refrigerant exiting the second heat exchange unit, increases the pressure of the mixed refrigerant, and directs the mixed refrigerant to the compressor,
wherein the refrigeration circuit includes a bypass path that directs refrigerant from the first heat exchange unit and the second heat exchange unit to the compressor and bypasses the ejector system, and
wherein the refrigeration circuit includes an ejector system control valve that directs refrigerant from one of the first heat exchange unit and the second heat exchange unit to a primary inlet of the ejector system and directs refrigerant from the other of the first heat exchange unit and the second heat exchange unit to a secondary inlet of the ejector system.

2. The system of claim 1, wherein the refrigeration circuit includes a first heat exchange unit control valve that directs refrigerant from the first heat exchange unit towards the ejector system in a first position and directs refrigerant from the first heat exchange unit towards the bypass path in a second position, and a second heat exchange unit control valve that directs refrigerant from the second heat exchange unit towards the ejector system in a first position and directs refrigerant from the second heat exchange unit towards the bypass path in a second position.

3. The system of claim 1, further comprising a controller that compares a first heat exchanger unit evaporator outlet data of refrigerant exiting the first heat exchange unit with a second heat exchanger unit evaporator outlet data of refrigerant exiting the second heat exchange unit, directs refrigerant from the first heat exchange unit and the second heat exchange unit to the bypass path when the first heat exchange unit evaporator outlet data is substantially similar to the second heat exchange unit evaporator outlet data, and directs refrigerant from the first heat exchange unit and the second heat exchange unit to the ejector system when the first heat exchange unit evaporator outlet data is not substantially similar to the second heat exchange unit evaporator outlet data.

4. The system of claim 3, wherein when the first heat exchange unit evaporator outlet data is not substantially similar to the second heat exchange unit evaporator outlet data, the controller:
directs refrigerant from one of the first heat exchange unit and the second heat exchange unit having a higher evaporator outlet data to a primary inlet of an ejector system;
directing refrigerant from the other of the first heat exchange unit and the second heat exchange unit to a secondary inlet of the ejector system; and
the ejector system mixing refrigerant from the primary inlet with refrigerant of the secondary inlet, increasing the pressure of the mixed refrigerant, and directing the mixed refrigerant towards a suction port of the compressor.

5. A method for operating a multi-zone transport refrigeration system for a transport unit having a plurality of zones, the method comprising:
obtaining a first evaporator outlet data of refrigerant from a first heat exchange unit evaporator;
obtaining a second evaporator outlet data of refrigerant from a second heat exchange unit evaporator;
comparing the first evaporator outlet data with the second evaporator outlet data;
when the first evaporator outlet data is greater than the second evaporator outlet data, directing refrigerant from the first heat exchange unit to a primary inlet of an ejector system and directing refrigerant from the second heat exchange unit to a secondary inlet of the ejector system;
when the first evaporator outlet data is less than the second evaporator outlet data, directing refrigerant from the second heat exchange unit to a primary inlet of an ejector system and directing refrigerant from the first heat exchange unit to a secondary inlet of the ejector system; and
the ejector system mixing refrigerant from the primary inlet with refrigerant of the secondary inlet, increasing the pressure of the mixed refrigerant, and directing the mixed refrigerant towards a suction port of a compressor of the multi-zone transport refrigeration system.

6. The method of claim 5, further comprising directing refrigerant from the first heat exchange unit and the second heat exchange unit along a bypass path that bypasses the ejector system to the suction port when the first evaporator outlet data is substantially similar to the second evaporator outlet data.

7. The method of claim 6, wherein directing refrigerant from the first heat exchange unit and the second heat exchange unit along the bypass path includes a controller instructing both a first heat exchange unit control valve and a second heat exchange unit control valve to operate in a second condition.

8. The method of claim 5, wherein directing refrigerant from the first heat exchange unit to the primary inlet and directing refrigerant from the second heat exchange unit to the secondary inlet includes a controller instructing an ejector system control valve of the multi-zone transport refrigeration system to operate in a first position, and
wherein directing refrigerant from the second heat exchange unit to the primary inlet and directing refrigerant from the first heat exchange unit to the secondary inlet includes the controller instructing the ejector system control valve to operate in a second position.

9. The method of claim 5, further comprising:
determining whether a power source that supplies power to the compressor is operating safely, and
reducing the amount of refrigerant directed to the compressor when the power source is not operating safely.

10. The method of claim 5, further comprising:
determining whether there is an unsafe load on the compressor;

determining whether an ambient temperature of air surrounding the transport unit is greater than an ambient temperature threshold; and turning off the multi-zone transport refrigeration system when it is determined that there is an unsafe load on the compressor and it is determined that the ambient temperature is greater than the ambient temperature threshold.

11. The method of claim 5, wherein directing refrigerant from the first heat exchange unit to the primary inlet and directing refrigerant from the second heat exchange unit to the secondary inlet includes a controller instructing an ejector system valve to operate in a first position, and wherein directing refrigerant from the second heat exchange unit to the primary inlet and directing refrigerant from the first heat exchange unit to the secondary inlet includes the controller instructing the ejector system valve to operate in a second position.

12. A refrigerated transport unit comprising:
a transport unit having a plurality of zones; and
a multi-zone transport refrigeration system that provides independent climate control for each of the plurality of zones, the multi-zone transport refrigeration system including:
    a refrigeration circuit that includes:
        a compressor,
        a first heat exchanger downstream of the compressor,
        a first heat exchange unit downstream of the first heat exchanger, wherein the first heat exchange unit provides independent climate control to a first zone of the plurality of zones of the transport unit,
        a second heat exchange unit downstream of the first heat exchanger, wherein the second heat exchange unit provides independent climate control to a second zone of the plurality of zones of the transport unit, and
        an ejector system downstream of both the first heat exchange unit and the second heat exchange unit and upstream of the compressor, wherein the ejector system mixes refrigerant exiting the first heat exchange unit with refrigerant exiting the second heat exchange unit, increases the pressure of the mixed refrigerant, and directs the mixed refrigerant to the compressor,
    wherein the refrigeration circuit includes a bypass path that directs refrigerant from the first heat exchange unit and the second heat exchange unit to the compressor and bypasses the ejector system, and wherein the refrigeration circuit includes an ejector system control valve that directs refrigerant from one of the first heat exchange unit and the second heat exchange unit to a primary inlet of the ejector system and directs refrigerant from the other of the first heat exchange unit and the second heat exchange unit to a secondary inlet of the ejector system.

13. The refrigerated transport unit of claim 12, wherein the refrigeration circuit includes a first heat exchange unit control valve that directs refrigerant from the first heat exchange unit towards the ejector system in a first position and directs refrigerant from the first heat exchange unit towards the bypass path in a second position, and a second heat exchange unit control valve that directs refrigerant from the second heat exchange unit towards the ejector system in a first position and directs refrigerant from the second heat exchange unit towards the bypass path in a second position.

14. The refrigerated transport unit of claim 12, wherein the multi-zone transport system includes a controller that compares a first heat exchanger unit evaporator outlet data of refrigerant exiting the first heat exchange unit with a second heat exchanger unit evaporator outlet data of refrigerant exiting the second heat exchange unit, directs refrigerant from the first heat exchange unit and the second heat exchange unit to the bypass path when the first heat exchange unit evaporator outlet data is substantially similar to the second heat exchange unit evaporator outlet data, and directs refrigerant from the first heat exchange unit and the second heat exchange unit to the ejector system when the first heat exchange unit evaporator outlet data is not substantially similar to the second heat exchange unit evaporator outlet data.

15. The refrigerated transport unit of claim 14, wherein when the first heat exchange unit evaporator outlet data is not substantially similar to the second heat exchange unit evaporator outlet data, the controller:

directs refrigerant from one of the first heat exchange unit and the second heat exchange unit having a higher evaporator outlet data to a primary inlet of an ejector system;

directing refrigerant from the other of the first heat exchange unit and the second heat exchange unit to a secondary inlet of the ejector system; and the ejector system mixing refrigerant from the primary inlet with refrigerant of the secondary inlet, increasing the pressure of the mixed refrigerant, and directing the mixed refrigerant towards a suction port of the compressor.

\* \* \* \* \*